United States Patent
Loether et al.

(10) Patent No.: US 11,278,119 B2
(45) Date of Patent: Mar. 22, 2022

(54) FLAT PANEL TELEVISION MOUNT

(71) Applicant: IdeaWorkx LLC, Gaithersburg, MD (US)

(72) Inventors: Jeff Loether, Germantown, MD (US); Robert C. Hendricks, Woodbine, MD (US); Luis-Eduardo Soares, Montgomery Village, MD (US)

(73) Assignee: IdeaWorkx LLC, Gaithersburg, MD (US)

( * ) Notice: Subject to any disclaimer, the term of this patent is extended or adjusted under 35 U.S.C. 154(b) by 0 days.

(21) Appl. No.: 16/009,890

(22) Filed: Jun. 15, 2018

(65) Prior Publication Data

US 2018/0360216 A1      Dec. 20, 2018

Related U.S. Application Data

(60) Provisional application No. 62/520,231, filed on Jun. 15, 2017.

(51) Int. Cl.
*A47B 97/00*      (2006.01)
*F16M 13/02*      (2006.01)

(52) U.S. Cl.
CPC ........... *A47B 97/001* (2013.01); *F16M 13/02* (2013.01); *F16M 13/027* (2013.01)

(58) Field of Classification Search
USPC ............... 248/466, 489, 494, 495, 917, 918; 40/757, 642.02, 611.06; 348/836; 361/724; 211/32, 87.01
See application file for complete search history.

(56) References Cited

U.S. PATENT DOCUMENTS

| | | | | |
|---|---|---|---|---|
| 1,388,956 A | * | 8/1921 | Kozlowsky | A47G 1/08 40/742 |
| 2,905,412 A | * | 9/1959 | Kipp | A47G 1/1646 248/323 |
| 3,008,249 A | * | 11/1961 | Masters | F16B 12/02 248/316.8 |
| 3,045,835 A | * | 7/1962 | Hawthorne | A47F 5/118 108/180 |
| 3,188,028 A | * | 6/1965 | Waller | A47G 1/215 248/316.8 |
| 3,203,142 A | * | 8/1965 | Narmore | A47K 1/08 248/201 |
| 4,187,630 A | * | 2/1980 | Giulie | A47G 1/0611 40/757 |
| 4,269,382 A | * | 5/1981 | Coulson | A47G 1/02 248/472 |

(Continued)

OTHER PUBLICATIONS

Electric Mirror, Loft Bathroom Mirror TV (https://www.electricmirror.com/product/loft-bathroom-mirror-tv/, pp. 1-4 (Year: 2019).*

(Continued)

*Primary Examiner* — Alfred J Wujciak
(74) *Attorney, Agent, or Firm* — Florek & Endres PLLC

(57) ABSTRACT

A flat panel television mount having a support for mounting a flat panel television, a cap adapted to be coupled to at least one of a ceiling and a wall, a base adapted to be coupled to at least one of a floor and a wall, a cap dampening member positioned between the cap and the support, and a base dampening member positioned between the base and the support.

21 Claims, 7 Drawing Sheets

(56) References Cited

U.S. PATENT DOCUMENTS

| | | | | |
|---|---|---|---|---|
| 4,364,538 | A | * | 12/1982 | Tomlinson ............... A47G 1/18 24/115 H |
| 5,337,988 | A | * | 8/1994 | Kurtz .................. F16M 13/022 248/477 |
| 6,659,418 | B2 | * | 12/2003 | Lemire ................ A47G 1/0655 248/476 |
| 6,672,560 | B1 | | 1/2004 | Hart |
| 8,237,875 | B2 | * | 8/2012 | Nguyen ................ H04N 5/655 348/841 |
| 8,353,490 | B2 | * | 1/2013 | Spinelli .................. F16M 13/02 248/201 |
| 2006/0256584 | A1 | * | 11/2006 | Paoluccio ............... F21S 2/005 362/652 |
| 2007/0018062 | A1 | * | 1/2007 | Calinescu ............. F16M 13/02 248/220.21 |
| 2010/0224751 | A1 | * | 9/2010 | Hochhalter ............ A47B 81/06 248/314 |
| 2012/0276339 | A1 | * | 11/2012 | Pearce ............... B29D 99/0092 428/160 |
| 2017/0055732 | A1 | * | 3/2017 | Krake .................... A47G 1/205 |

OTHER PUBLICATIONS

WikipediA, Felt, (https://en.wikipedia.org/wiki/felt, pp. 1-8 (Year: 2019).*

3M, 3M Viscoelastic Damping Polymer 112 Series, May 2017, pp. 1-8 (Year: 2017).*

* cited by examiner

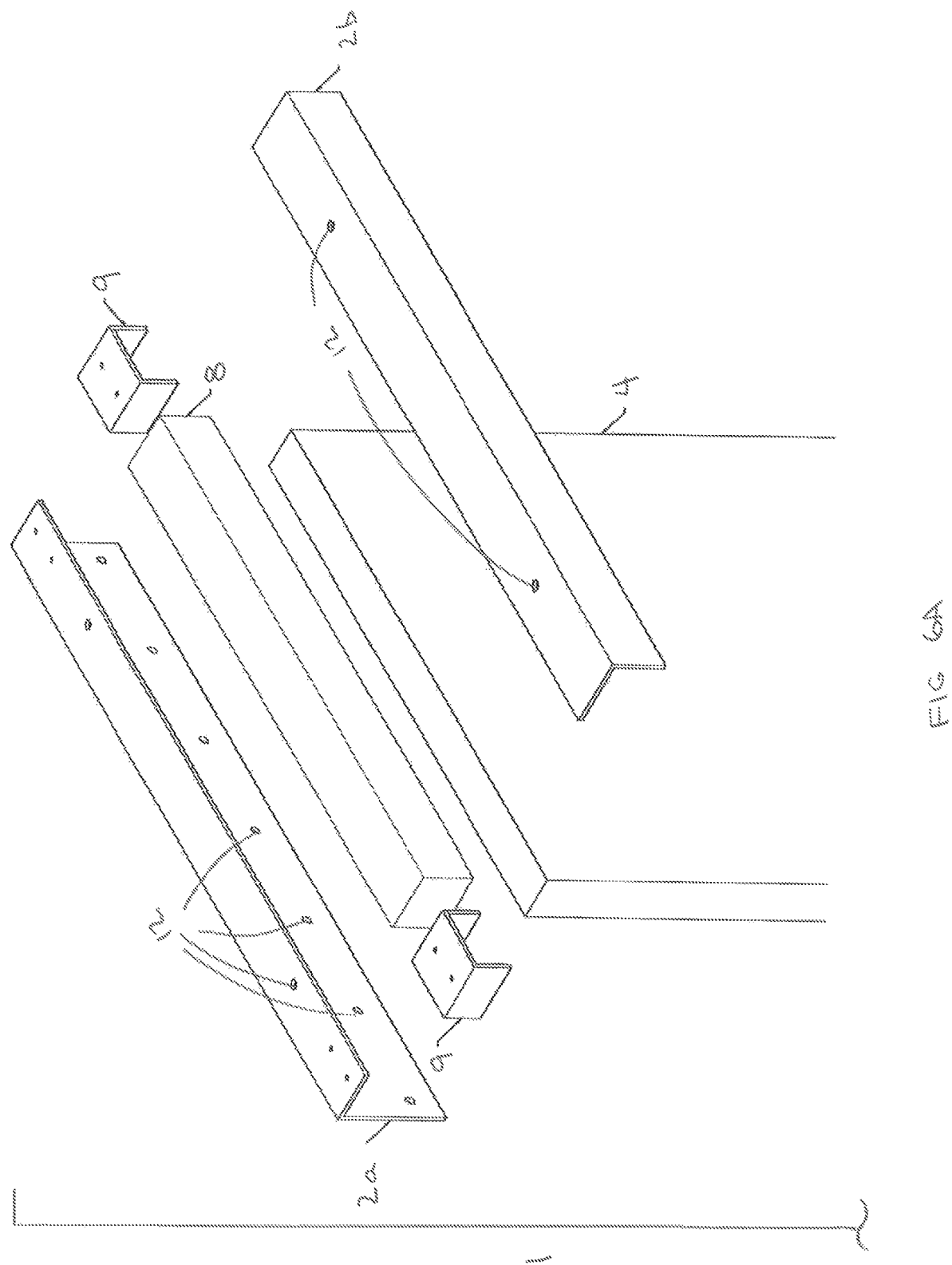

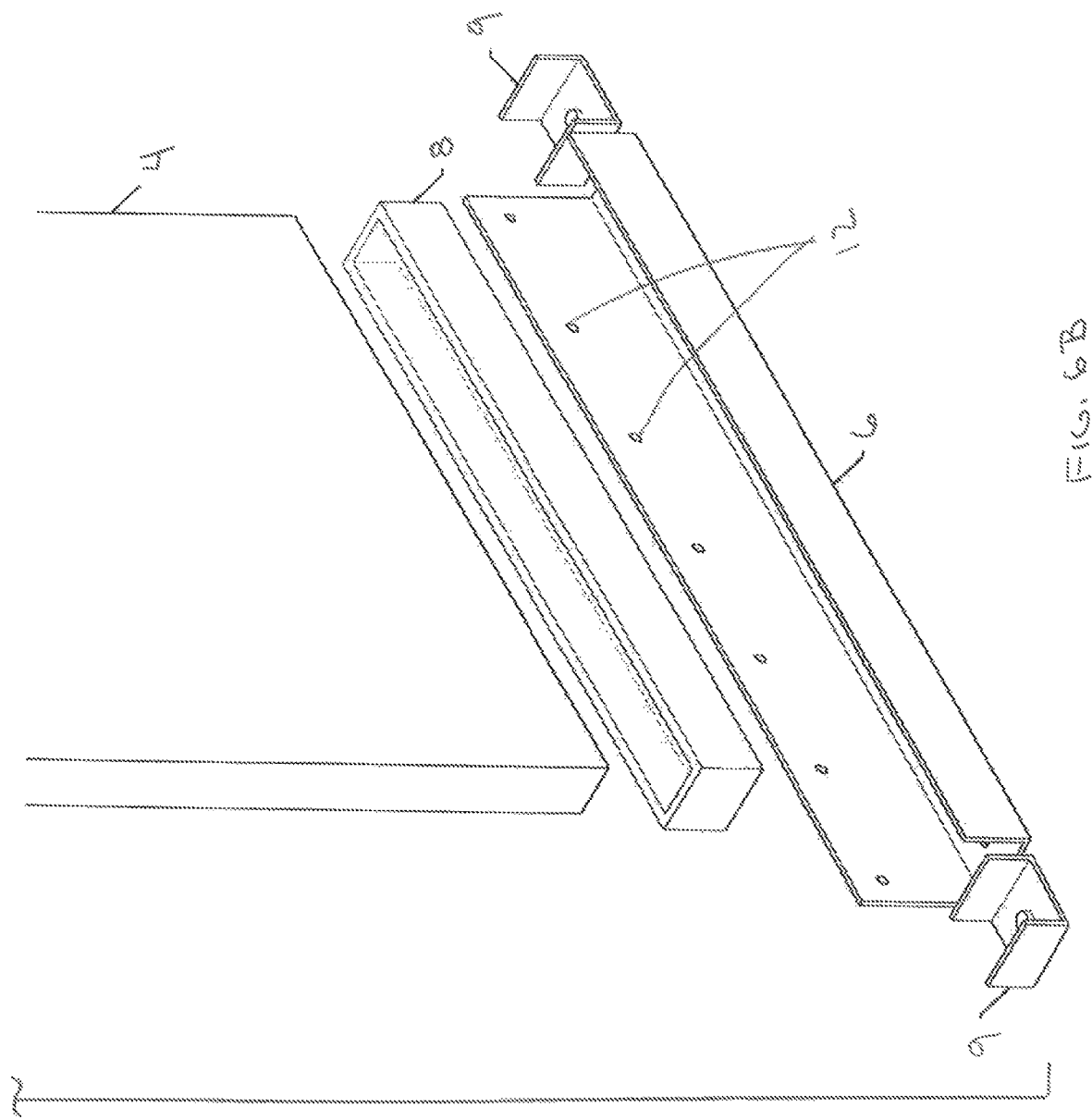

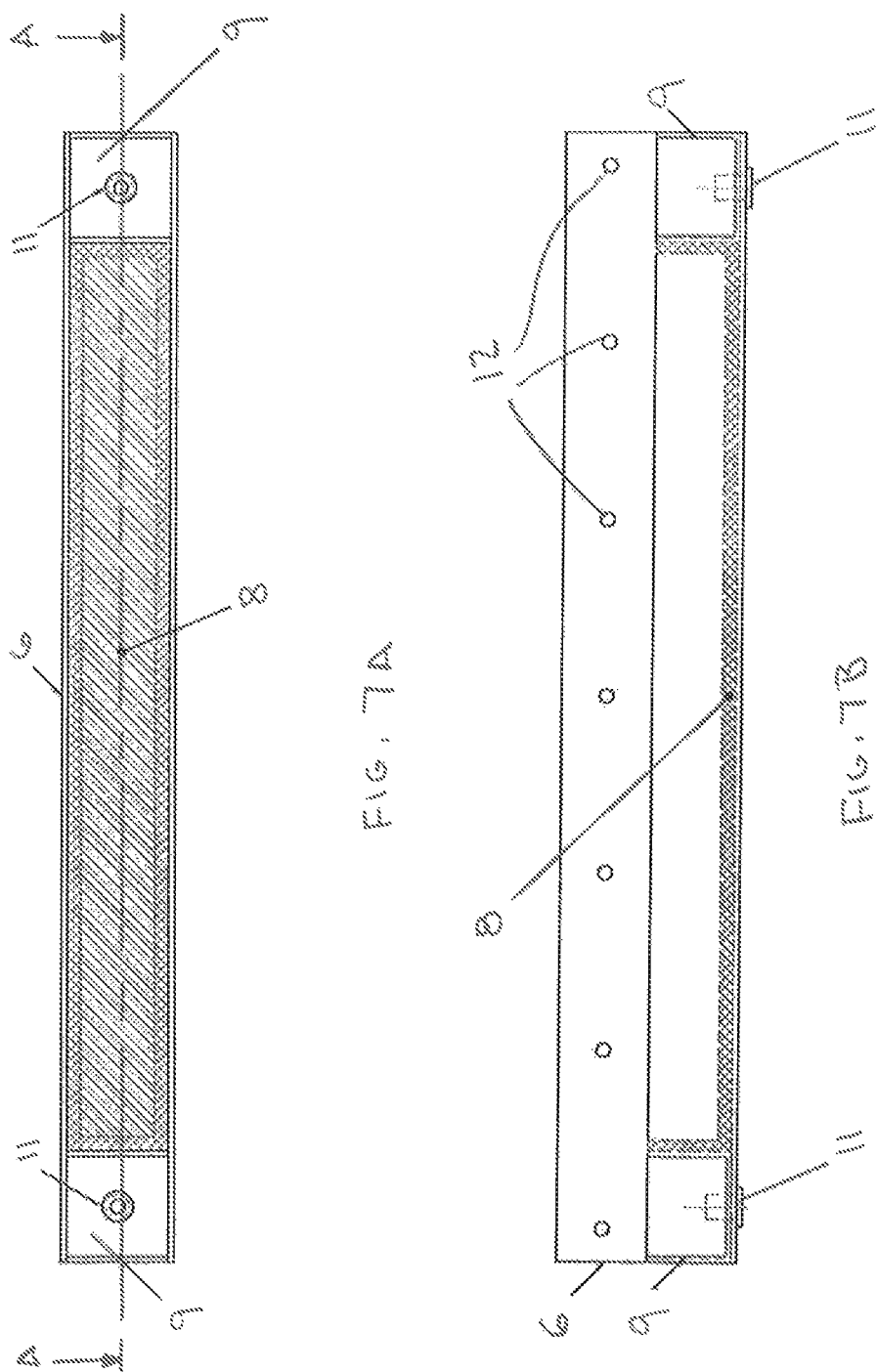

FLAT PANEL TELEVISION MOUNT

FIELD OF THE INVENTION

The present invention relates to a flat panel television mount, and more particularly to a flat panel television mount adapted for fast, easy installation, reduced wall vibration, and reduced damage to existing rooms.

BACKGROUND OF THE INVENTION

With the rise of flat panel television displays, users want to mount the television displays on walls rather than on stands or furniture. Because speakers are often integrated into flat panel television displays, however, they may transmit sound energy from the flat panel television to the wall display mount as vibrations. These vibrations are then transmitted to the room on the other side of the wall.

Moreover, as flat panel television displays got larger, manufacturers started to minimize the size of the frame around the image area of the television display. These "thin bezel" displays did not leave room for the speakers, so manufacturers have moved the speakers from the front to the back of the display. This caused the sound to carry towards the wall behind the display, further facilitating the vibrations and amplifying the sound directed toward the adjacent room.

In hotels, and in some apartments or condominiums, rooms often abut another living area or room and are frequently mirrored in design. This means that televisions may be oriented back-to-back against a common wall. As a result, the rise of flat panel televisions mounted on walls has resulted in guests and residents becoming increasingly disturbed by vibrations and loud noises from the speakers on a television display in an adjacent room.

Before the present invention, the only way to prevent these disturbances would have been to rebuild the walls between rooms to provide sufficient support structure with improved sound and vibration insulation. Some hotels have even begun to revisit placing flat panel televisions on stands or furniture to avoid this problem.

There are also other challenges to wall mounting. For example, there is no way to get power and signal cables from ground level outlets and jacks to the wall mounted television without resorting to surface cableways or cutting open the walls to run wiring through the wall interior.

Developers and designers would prefer to be able to continue to wall mount televisions not only for aesthetic reasons, but also for security, as televisions that are secured to a wall mount are more difficult to steal. Accordingly, there is a need for a television mount that solves the above mentioned problems.

SUMMARY OF THE INVENTION

The present invention is directed to a television mount comprising a support for mounting a flat panel television, a cap adapted to be coupled to at least one of a ceiling and a wall, a base adapted to be coupled to at least one of a floor and a wall, a cap dampening member positioned between the cap and the support, and a base dampening member positioned between the base and the support. In a preferred embodiment, the dampening members comprise a resilient layer capable of reducing vibrations from the support to the base and/or cap, thereby reducing vibrations to the wall, floor and/or ceiling to which the base and cap are secured.

In a most preferred embodiment, the support further comprises a cushioning member between the support and the wall.

The cap is preferably formed from a rigid material, such as a metal, wood, plastic or similar material, including combinations thereof, which is removably fastened to the wall and/or the ceiling of a room by one or more fasteners, and can be fashioned in one or more component parts. In a most preferred embodiment, the cap includes one or more apertures through which a fastener such as a screw passes, to screw the cap to the wall and/or the ceiling, preferably adjacent a wall, in the location that the wall mount is to be positioned.

The preferred fastener provides adequate mechanical support while allowing for easy installation and removal of the cap on one or more of the ceiling and/or wall. It also allows the television mount to rest stably against a wall or ceiling. Suitable fasteners for securing the cap to the wall and/or ceiling include, but are not limited to, screws, nails, bolts, clips, pins, adhesives, latches, channels, snaps, and the like, including combinations thereof.

The base is preferably formed from a rigid material, such as a metal, wood, plastic or similar material, including combinations thereof, which is removably placed on the floor or fastened to the wall and/or floor of a room by one or more fasteners, and can also be fashioned in one or more component parts. When the base is formed to rest on the floor, it may be at least partially held in place on the floor by the weight of the mount and the television display mounted thereon. However, the base preferably has one or more associated floor engagement members and/or wall fasteners that provide additional structural support for limiting movement of the base on the floor.

In an embodiment where the cap and/or the base are comprised of one or more cap and/or base portions, the cap may comprise a first cap portion with a first side that is adapted to attach to a wall, or a first cap portion in substantially an "L" shape to attach to at least one of a wall or ceiling, leaving the front of the cap substantially open to receive the support. If desired, a second cap portion can cooperate with the first cap portion or the support, to cover the front of the support once the support is affixed to the first cap portion.

This configuration, with or without the second cap portion, aids in installation, where the cap can be affixed to one or more of the wall and the ceiling prior to affixing the support to the cap. Moreover, this configuration may be used for the base instead of the cap, or for both the base and the cap, as desired. Optionally, the cap and/or the base may also include one or more stop brackets at the lateral ends of the cap and/or base to close the end of the cap and/or base.

Any suitable floor and/or wall engagement members can be used in connection with the base. In some embodiments, the floor engagement members can be an adjustable friction foot to provide a leveling function in addition to a floor engagement function. In some embodiments, for instance when used in a room with preinstalled carpet, the floor engagement members can be one or more carpet spikes, and preferably one or more adjustable carpet spikes. The base may also be removably secured to the floor and/or wall by fastening members, including but are not limited to screws, nails, bolts, clips, pins, adhesives, latches, channels, snaps, and the like, including combinations thereof.

The vibration dampening member is incorporated between the support and the cap and between the support and the base. The vibration dampening member not only provides structural support, but most importantly helps reduce vibration on the television display from reaching the wall and/or ceiling or floor. The vibration dampening member is most preferably a resilient lining that surrounds the end of the support received within each of the cap and base, including but not limited to the front, end and back of the support, and optionally the sides of the support, received in the base and/or cap.

Most preferably, the resilient layer is included on any interior surface of the cap and base against which the support rests. For example, the resilient layer can be formed around the inner surfaces of the base and/or cap receiving the support or may be formed around the outer surfaces of the portions of the support placed within the base and/or cap.

The vibration dampening member can comprise any suitable material that provides vibration dampening so as to reduce the vibrations of the television from being transferred through the support and cap and/or base into the wall, ceiling and/or floor to which the base and/or cap are secured. For example, vibration dampening materials made of an elastic polyurethane with a mixed-cell pore structure, such as SYLOMER® or SYLODAMP® available from Getzner USA, Inc. may be used in the vibration dampening member, without limitation.

The support can be any structure capable of retaining a television display that can be secured between the base and the cap. For example, the support can comprise wood, metal, plastic, fiberboard or the like. Preferably, the height of the support is adjustable or customizable, so that the mount can be fitted in rooms with variations in height.

In an embodiment, the support comprises adjustable telescoping frame members that cooperate to vary the overall height of the support. Adjustable telescoping frame members allow for the television mount to be easily stored, transported, installed, removed, and reused. Alternatively, however the support can be fashioned from two or more members that can be secured at different positions to adjust the overall height of the support, or can be fashioned from members that can be cut or otherwise reduced in size for installation within the cap and base.

In a most preferred embodiment, a spacer is included for placement between the support and the wall to close the gap between the support and the wall, to avoid papers, magazines or other small objects being lost behind the support, and to provide additional vibration dampening.

In a preferred embodiment, the support is configurable with VESA or FDMI mounting standards for mounting a television display in accordance with well-known methods. In a most preferred embodiment, the support is configurable with VESA tilt, hinge, and/or swivel hardware.

To further reduce vibrations, some embodiments of the television mount can include additional features. For example, the television mount can include structure for mounting a sound bar towards the front of the television away from the wall. In another example, a deflector can be added on the mount to redirect sound away from rear-facing speakers.

It is anticipated that the preferred television mount can be removed or relocated with minimal damage and/or repair. The preferred television mount can be made to accommodate existing baseboards and ceiling moldings about the base and/or cap, to improve the aesthetics of the mount. Preferably, the television mount comprises a chase for power and signal cabling to the television or other devices, concealing the cabling and reducing the need to repair walls or provide a surface conduit in a wall in the area of the television mount.

The television mount can be supplied as a kit with instructions for assembly or it can be supplied as a fully assembled unit. The television mount can be finished and/or refinished using any desired finish including wood, plastic laminate, paint, vinyl etc. In some embodiments, the television mount is no more than 2" deep.

The support can include coverings, such as removable panels, sleeves, wraps, etc., for accessing outlets, cables or the like located within or behind the support. In some embodiments, the support further comprises shelving or pockets that can be used to hold or store books, magazines, promotional information, remotes, etc. The television mount can also comprise mounting, including concealed and/or secure mounting, for additional devices or connections, including but not limited to set-top boxes, DVRs, game consoles, wireless routers, outlets, HDMI jacks, Ethernet jacks, power outlets, etc. The television mount can also include decorative features such as shadowboxes, LED lighting, nightlights, halo lighting, sconces, etc. Preferably, the television mount can include connections that accommodate a wide variety of devices, including but not limited to Ethernet jacks, telephone jacks, USB ports, electrical outlets, etc.

BRIEF DESCRIPTION OF THE DRAWINGS

The attached drawings are intended to better illustrate a preferred embodiment of the present invention without limiting the invention in any manner whatsoever.

FIG. 6A is an exploded view of the top portion the television mount of the present invention.

FIG. 6B is an exploded view of the bottom portion the television mount of the present invention.

FIG. 7A is a top plan view of the base of the television mount of the present invention.

FIG. 7B is front elevation of the base of the television mount of the present invention in cross-section through line A-A of FIG. 7A.

DETAILED DESCRIPTION OF THE PREFERRED EMBODIMENT

Figure 1:
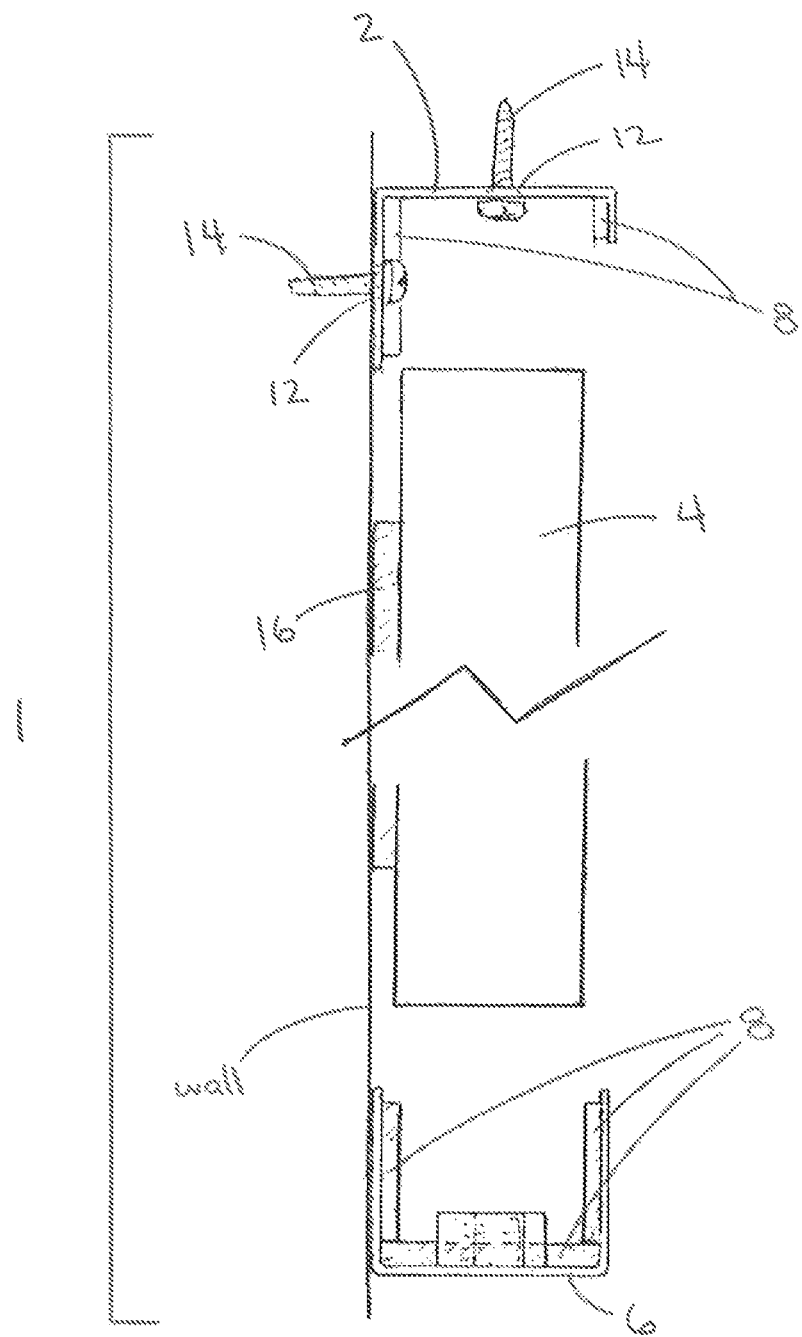
FIG. 1 is a partial side elevation of an embodiment of the flat-panel television mount of the present invention in cross-section.

The following description of the preferred embodiment is presented to describe the present invention without limiting the scope of the invention in any manner whatsoever.

As shown in the accompanying drawings illustrating the preferred embodiments, the present invention is directed to a flat-panel television mount 1 comprising a support 4 for mounting a flat panel television, a cap 2 adapted to be coupled to at least one of a ceiling and a wall, a base 6 adapted to be coupled to at least one of a floor and a wall, a cap dampening member 8 positioned between the cap and the support, and a base dampening member 8 positioned between the base and the support.

Figure 2:
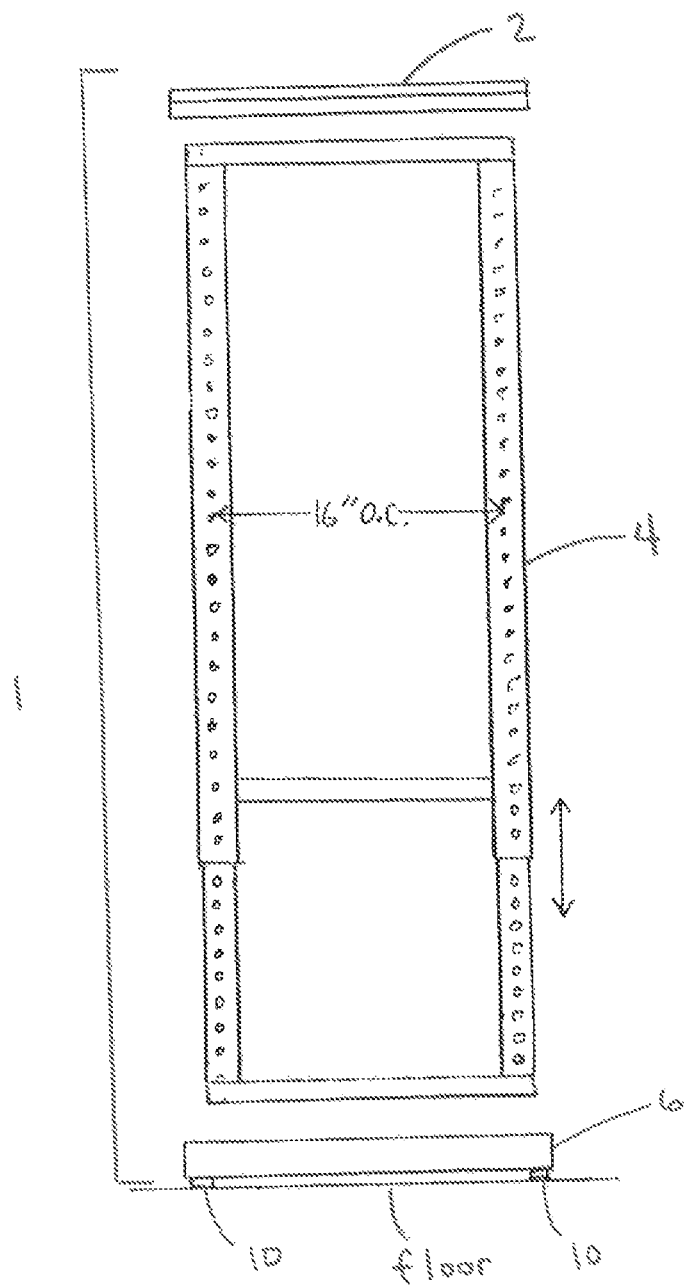
FIG. 2 is a partially exploded front elevation of an embodiment of the flat-panel television mount of the present invention.

The flat-panel television mount 1 provides a vertical structure that can be installed adjacent a wall on which a flat panel television can be mounted instead of mounting the television directly against a wall. As best seen in FIG. 2, the flat panel television mount 1 is oriented such that the support 4 is retained between the cap 2 and the base 6, with the dampening members 8 captured between the cap 2 and support 4 and between the base 6 and the support 4 to dampen vibrations from the television mounted on the support 4.

The preferred cap 2 is preferably rigid and may form a channel with a first side that is adapted to be placed against a wall, an opposed side that covers a portion of the top of the support 4 and a connecting wall that may be placed against a ceiling. In the embodiment of FIGS. 1 and 2, the first side, opposed side and connecting wall of the cap 2 are a single component shaped in the form of a channel, where the dampening member 8 is positioned between the cap 2 and the support 4. Notwithstanding, it is understood that the cap 2 can be formed of more than one component, as shown in FIGS. 4-6B.

Figure 5A:
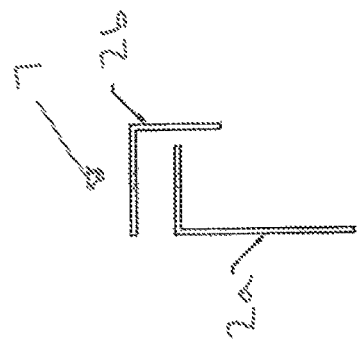
FIG. 5A is an exploded view of the component parts of an alternative embodiment of the cap of the present invention.
Figure 5B:
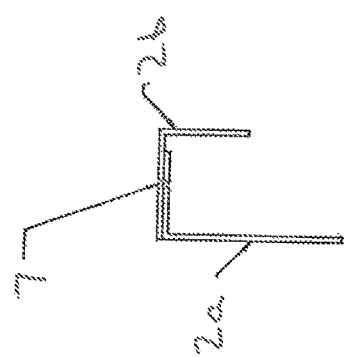
FIG. 5B is a side elevation of the alternative embodiment of the cap shown in FIG. 5A with the component parts connected.
Figure 4:
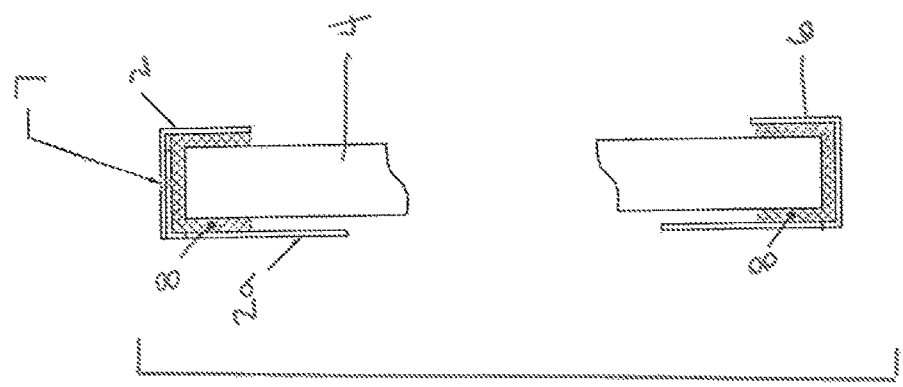
FIG. 4 is a partial side elevation of an alternative embodiment of the flat-panel television mount of the present invention in cross-section.

In the embodiment of FIGS. 4-6B, the cap 2 comprises a inner member 2a and an outer member 2b that cooperate to form a channel which captures a portion of the upper end of the support 4 therebetween. As shown in FIGS. 4-5B, one or more set screws 7 are used to maintain the inner member 2a and outer member 2b in fixed relationship.

Preferably, the cap 2 further comprises stop brackets 9 at each end, providing a stop for the support 4/dampening member 8 at the ends of the cap 2. The stop brackets 9 can take any shape, however, it is preferred that they fit within the channel of the cap 2. Moreover, the stop brackets 9 can include covers or other structure to further enhance the visual appearance of the cap 2/television mount 1.

The cap 2 shown comprises apertures 12 for receiving one or more fasteners, such as screws 14, to affix the cap 2 to a wall and/or ceiling. In some embodiments, the cap 2 comprises one or more apertures 12 on the first side for fixing the cap 2 to a wall with screws 14. Likewise, in some embodiments, the cap 2 comprises one or more apertures 12 on the connecting wall for fixing the cap 2 to a ceiling.

The base 6 is also preferably rigid and likewise preferably forms a channel for receiving a portion of the bottom end of the support 4 and dampening member 8, with a first side that is adapted to be placed against a wall, an opposed side that covers the front of the bottom of the support 4 and a connecting wall that may be placed against or parallel to the floor.

Figure 3A:
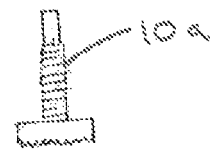
FIG. 3A is an elevation of floor engagement member suitable for use with the mount shown in FIG. 2 on hard floors.
Figure 3B:
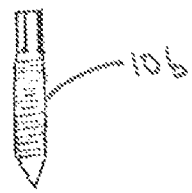
FIG. 3B is an elevation of floor engagement member suitable for use with the mount shown in FIG. 2 on carpeted floors.

In the embodiment shown in FIG. 2, the base 6 comprises one or more floor engagement members 10 that are coupled to the base 6 and engage the floor or carpet. For example, as shown in FIG. 3, floor engagement members 10 can be an adjustable friction foot 10a or an adjustable carpet spike 10b. In the preferred embodiment shown in FIGS. 3A-3B and 6B-7B, the friction foot 10a or carpet spike 10b comprise a threaded post and a cooperating threaded insert 11 is fixed to opposed ends of the base 6. In this embodiment, the friction foot 10a or carpet spike 10b can be threaded into the threaded insert 11 to a user determined depth to level the television mount 1.

Preferably, the base 6 also further comprises stop brackets 9 at each end, providing a stop for the support 4/dampening member 8 at the ends of the base 6. The stop brackets 9 can take any shape, however, it is preferred that they fit within the channel of the base 6. Moreover, the stop brackets 9 affixed to the base can likewise include covers or other structure to further enhance the visual appearance of the base 6/television mount 1.

The base 6 shown in FIGS. 6B-7B also preferably comprises apertures 12 for receiving one or more fasteners, such as screws 14, to affix the base 6 to a wall. In some embodiments, if the base is to be more securely mounted to the floor, the threaded inserts 11 can be replaced with apertures for receiving one or more fasteners, such as screws 14.

The dampening member 8 is positioned between the exterior of the support 4 and the inner walls of the cap 2 and base 6 to dampen vibrations from the television, speakers or other components mounted on the television mount 1. The resilient layers 8 are preferably U-shaped components, most preferably with closed lateral ends, that fit securely within the space between the support 4 and each of the cap 2 and the base 6. As mentioned above, the dampening member 8 can be attached to one or both of the support 4 and cap 2/base 6, or can merely reside between the support 4 and cap 2/base 6 to dampen the vibrations between the support 4 and cap 2/base 6.

The support 4 captured between the base 6 and the cap 2 provides structural support to the television mounted on the support 4. In some embodiments, for example as shown in FIG. 2, the support 4 comprises adjustable telescoping members. These telescoping members cooperate to vary the overall height of the support 4. In the exemplary embodiment shown in FIG. 2, the support 4 has stud spacing that is 16 inches on center, matching standard television wall mounts and stud spacing.

Figure 8C:
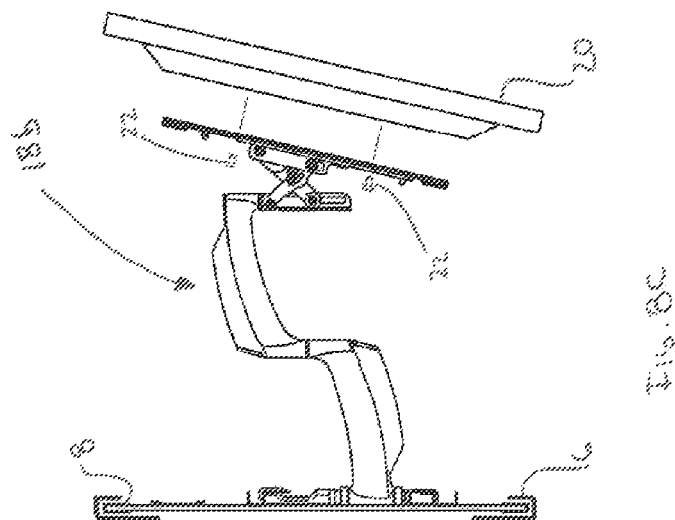
FIG. 8C is a side elevation of the television mount with tilt/hinge/swivel VESA hardware for mounting a television display.
Figure 8B:
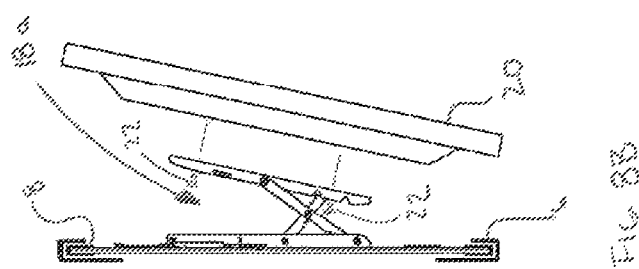
FIG. 8B is a side elevation of the television mount with tilt VESA hardware for mounting a television display.
Figure 8A:
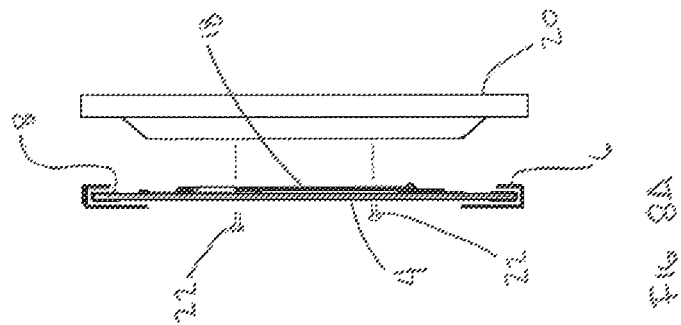
FIG. 8A is a side elevation of the television mount with VESA hardware for mounting a television display.

In the preferred embodiment shown in FIGS. 8A-8C and 9A-9C, the support 4 comprises VESA (Video Electronics Standards Association) or FDMI (Flat Display Mounting Interface) mounting hardware 18 incorporated on the support 4 for mounting a television display 20 in accordance with well-known methods. For example, FIG. 8A shows the support 4 with generic VESA hardware 18, including screws 22 for engagement of threaded holes on the back of the display 20 in a VESA pattern. Similarly, FIG. 8B shows the support 4 with generic VESA tilt/hinge hardware 18a, and FIG. 8C shows the support 2 with generic VESA tilt, hinge, and/or swivel hardware 18b, both with screws 22 for engagement of threaded holes on the back of the display 20 in a VESA pattern.

In the embodiment of FIG. 1, the support 4 also preferably comprises a spacer 16, which can be made of a suitable material for filling the space between the support 4 and the adjacent wall. The spacer 16 preferably comprises a deformable cushioning layer which is maintained between the support 4 and wall, not only providing additional dampening, but also prohibiting items from slipping into the gap between the support 4 and the wall and being lost behind the support 4.

Variations, modifications and alterations to the preferred embodiment of the present invention described above will make themselves apparent to those skilled in the art. All such variations, modifications, alterations and the like are intended to fall within the spirit and scope of the present invention.

The invention claimed is:

1. A flat panel television mount comprising a support adapted for mounting a flat panel television, said support comprising VESA flat display mounting interface standard hardware including a fastener adapted to attach to VESA mounting hardware on the back of a flat panel television, a cap adapted to be coupled to at least one of a ceiling and a wall for receiving a top of the support, a base adapted to be coupled to at least one of a floor and a wall for receiving a bottom of the support, a cap dampening member positioned between the cap and the support, and a base dampening member positioned between the base and the support, wherein at least one of the cap dampening member and the base dampening member comprises a resilient, elastomeric material and further wherein the support does not directly contact and is not directly affixed to the wall to help reduce sound vibrations generated by the television from reaching the wall.

2. The flat panel television mount of claim 1, wherein at least one of the cap and/or the base comprise more than one portion.

3. The flat panel television mount of claim 2, wherein at least one of the cap and/or the base is in the form of a channel in which a portion of the support resides.

4. The flat panel television mount of claim 1, wherein the cap comprises two or more portions that form a channel in which a portion of the support resides.

5. The flat panel television mount of claim 1, further comprising an attachment member for directly coupling at least one of the cap to at least one of a wall and/or a ceiling and the base to at least one of the wall and/or floor.

6. The flat panel television mount of claim 5, wherein the attachment member comprises an aperture on at least one of the cap and/or base and a fastener, a portion of the fastener passing through the aperture for directly coupling the cap to at least one of the wall and/or the ceiling or the base to at least one of the wall and/or floor.

7. The flat panel television mount of claim 1, wherein the base is coupled directly to the floor by one or more floor engagement members.

8. The flat panel television mount of claim 7 wherein the one or more floor engagement members is selected from the group consisting of a friction foot, a spike an adjustable friction foot, an adjustable spike, and combinations thereof.

9. The flat panel television mount of claim 1, wherein the support comprises a fixed member.

10. The flat panel television mount of claim 1, wherein the support comprises an adjustable member.

11. The flat panel television mount of claim 10, wherein the support comprises one or more adjustable telescoping members for varying the height of the support.

12. The flat panel television mount of claim 1 wherein the support is made of a material selected from one of the group consisting of metal, wood, plastic, fiberboard, and combinations thereof.

13. The flat panel television mount of claim 1 further comprising a spacer that fills a gap between the support and a wall.

14. The flat panel television mount of claim 13, wherein the spacer is comprised of a cushioning material.

15. The flat panel television mount of claim 1 further comprising a covering for accessing outlets, cables and combinations thereof located within or behind the support.

16. The flat panel television mount of claim 15 wherein the covering is taken from one of the group consisting of a removable panel, a sleeve, a wrap, and combinations thereof.

17. The flat panel television mount of claim 1 further comprising a shelf and/or pocket adapted to hold one or more of books, magazines, promotional information, remotes and combinations thereof.

18. The flat panel television mount of claim 1 further comprising one or more mounting elements for mounting one or more additional electronic devices or connections.

19. The flat panel television mount of claim 1 further comprising a decorative feature taken from one of the group consisting of a shadowbox, LED lighting, a nightlight, halo lighting, a sconce, and combinations thereof.

20. The flat panel television mount of claim 1 wherein the resilient, elastomeric material is a mixed-cell pore structure material.

21. The flat panel television mount of claim 1 wherein the VESA flat panel television mounting hardware comprises tilt, hinge and/or swivel hardware.

* * * * *